United States Patent [19]

Tamura

[11] 4,326,386
[45] Apr. 27, 1982

[54] TEMPERATURE CONTROL CIRCUIT FOR AUTOMOBILE AIR-CONDITIONING SYSTEM

[75] Inventor: Yasushi Tamura, Ojima, Japan

[73] Assignee: Sankyo Electric Company Limited, Isesaki, Japan

[21] Appl. No.: 188,552

[22] Filed: Sep. 18, 1980

[30] Foreign Application Priority Data

Sep. 18, 1979 [JP] Japan .................. 54-118790
Nov. 16, 1979 [JP] Japan .................. 54-149312

[51] Int. Cl.³ .................. F25D 21/00; F25B 1/00
[52] U.S. Cl. .................. 62/150; 62/209; 62/229
[58] Field of Search ........ 62/209, 229, 150, 158; 340/599, 584; 236/78 R, 78 A, 78 B; 165/43; 307/117

[56] References Cited

U.S. PATENT DOCUMENTS

| | | | |
|---|---|---|---|
| 3,667,245 | 6/1972 | Till et al. | 62/229 |
| 4,020,358 | 4/1977 | Wyland | 307/117 |
| 4,297,851 | 11/1981 | Paddock et al. | 62/229 |

Primary Examiner—Albert J. Makay
Assistant Examiner—Harry B. Tanner
Attorney, Agent, or Firm—Hopgood, Calimafde, Kalil, Blaustein & Judlowe

[57] ABSTRACT

A temperature control circuit of an automobile air-conditioning system includes a temperature sensor for detecting the temperature of air blown into the room of the automobile. The signal detected by the sensor is compared at a first comparator with a voltage level corresponding to a predetermined temperature. The output of the first comparator at a time when the blown air temperature is lowered to the predetermined temperature, is delayed by a delay circuit and is applied to a second comparator. Then, the second comparator generates a signal for stopping the operation of the refrigerant compressor. The signal is also applied to a third comparator which maintain the stop signal until the signal corresponding to a higher temperature is applied thereto from the temperature sensor. Thus, the frost on the refrigerant evaporator can be defrosted before the compressor restarts.

A fourth comparator is used for controlling the temperature of the room of the automobile. Temperature detected signal from the temperature sensor or another sensor disposed in the room is compared with a variable reference signal at the fourth comparator, from which a similar signal for stopping the operation of the compressor at a time when the detected temperature is lowered to a temperature corresponding to the variable reference signal.

3 Claims, 6 Drawing Figures

TEMPERATURE CONTROL CIRCUIT FOR AUTOMOBILE AIR-CONDITIONING SYSTEM

BACKGROUND OF THE INVENTION

This invention relates to automobile air-conditioning system, and in particular to temperature control circuits in those systems.

It is well known in the prior art that the automobile air-conditioning system comprises a refrigerant system including a refrigerant compressor and a refrigerant evaporator, a temperature control circuit for controlling the operation of the refrigerant compressor in response to the temperature detected, and a blower system for blowing the cooled air into the room of the automobile. The refrigerant compressor is generally driven by the automobile engine, and an electromagnetic clutch is used for selectively transmitting the engine output to the refrigerant compressor. The temperature control is made by controlling operation of the electromagnetic clutch.

In a known temperature control, a temperature detecting element or a temperature sensor such as a thermistor is mounted on the refrigerant evaporator or in an air duct in which the cooled air flows to be blown into the automobile room. When the temperature detected by the temperature sensor is lowered than a predetermined temperature, the electromagnetic clutch is deenergized so that the compressor is not driven. When the temperature elevates to another predetermined higher temperature, the electromagnetic clutch is energized to transmit the engine output to the compressor so that the temperature is again lowered. Thereafter, similar operations are repeated so that the temperature in the automobile room may be maintained constant.

Generally speaking, there is provided a temperature difference between a temperature (this will be referred to a "compressor-stopped temperature") at which operation of the compressor is stopped and another temperature (this will be referred to a "compressor redriven temperature") at which the compressor is again driven. Considering that the frost on the evaporator degrades the cooling effect, the temperature difference must be determined large to prevent the evaporator from being frosted. This means that a time period when the compressor is not driven is long, and the temperature in the room, therefore, is not maintained comfortable. That is, when the compressor-stopped temperature is determined lower, the room is cooled excessively and, on the contrary, when the compressor-redriven temperature is determined high, the room is not cooled sufficiently.

In another known temperature control, the temperature sensor is disposed in the room. Because the temperature in the room is not always corresponding to the temperature of the air blown from the system into the room, and because the temperature variation of the room considerably delays from the variation of the temperature of the blown air, the temperature difference between the compressor-stopped temperature and the compressor-redriven temperature must be determined very small. Even if the small difference is determined, the temperature in the room does not elevate to the determined compressor-redriven temperature and the temperature of the blown air is sometimes elevated to make the persons uncomfortable.

SUMMARY OF THE INVENTION

It is an object of this invention to provide a temperature control circuit in an automobile air-conditioning system which can not only maintain the temperature of the blown air and the temperature in the automobile room comfortable but also prevent the evaporator from being frosted.

It is another object of this invention to provide a temperature control circuit in an automobile air-conditioning system wherein when the temperature of the blown air is lowered to a predetermined temperature, the refrigerant compressor is stopped after a predetermined time period even if the blown air is not yet cooled to another predetermined sufficient low temperature and, thereafter, is restarted at a time that the temperature of the blown air elevates to the other predetermined high temperature, whereby the frost on the refrigerant evaporator is prevented and/or removed.

It is still another object of this invention to provide the temperature control circuit having an additional circuit for controlling the compressor by the temperature in the automobile room.

It is yet another object of this invention to provide the temperature control circuit having a circuit for manually setting the control temperature. It is another object of this invention to realize the above-mentioned objects with simple circuit formation and low cost.

In an automobile air-conditioning system which has a refrigerating system including a refrigerant compressor and a refrigerant evaporator, and a temperature control circuit for controlling the operation of the refrigerant compressor in response to the temperature detected, the temperature control circuit according to this invention comprises first temperature detecting means for detecting the temperature of the air blown into the automobile room as an electric signal and first reference signal source means for generating a predetermined reference signal equal to the output signal of the first temperature detecting means corresponding to a predetermined first temperature. The output from the first temperature detecting means and the first reference signal are compared with one another at first comparing means which provides a first output at a time when the detected temperature is higher than the first temperature and a second output at a time when the detected temperature is lower than the first temperature. The second output is delayed at delay means and is fed to stop-signal generating means which provides a signal for stopping the operation of the refrigerant compressor. The stop signal is fed to stop-signal maintaining means and is maintained thereat until a time when a predetermined second temperature higher than the first temperature is detected by the first temperature detecting means. The stop signal from the stop-signal maintaining means is fed to means for controlling the operation of compressor driving means, to thereby stop the operation of the compressor during a time period when the stop signal is present at the output of the stop-signal maintaining means.

The temperature control circuit further comprises second temperature detecting means for detecting the temperature of the room of the automobile and second reference signal source means for generating a predetermined reference signal equal to the output signal of the second temperature detecting means corresponding to a predetermined third temperature. The output of the second temperature detecting means and the second reference signal are compared at second comparing means to provide a first output at a time when the detected temperature is higher than the third temperature and a second output at a time when the detected temperature is lower than the third temperature. The second output of said second comparing means is fed to the controlling means to thereby stop the operation of the compressor.

The temperature control circuit further comprises third reference signal source means for generating a reference signal which is variable corresponding to a desired temperature and which is equal to the output signal of the first temperature detecting means corresponding to a desired fourth temperature. The output of the first temperature detecting means and the third reference signal are compared at third comparing means to provide a first output at a time when the detected temperature is higher than the fourth temperature and a second output at a time when the detected temperature is lower than the fourth temperature. The second output of the third comparing means are fed to the controlling means to thereby stop the operation of the compressor.

Further objects and features and other aspects of this invention will be understood from the following detailed description of preferred embodiments of this invention with respect to the annexed drawings.

DETAILED DESCRIPTION OF PREFERRED EMBODIMENTS

Figure 1:
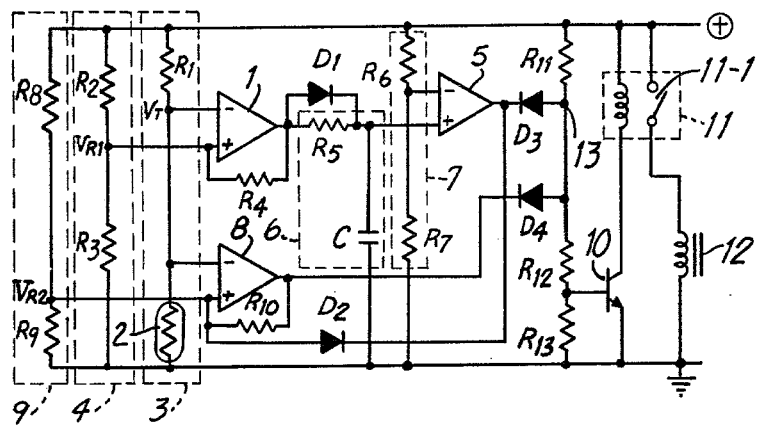
FIG. 1 is a circuit diagram of an embodiment of a temperature control circuit in an automobile airconditioning system according to this invention.

Referring to FIG. 1, a temperature control circuit shown therein comprises a voltage comparator 1 such as an operational amplifier. A thermistor 2 as a temperature sensor and a resistor $R_1$ form a voltage divider 3, the divided voltage of which is applied to an inverting input terminal (−) of comparator 1.

Thermistor 2 is mounted on a refrigerant evaporator in a refrigerating system or in a duct in which air flows to blow into a room of an automobile, in order to detect the temperature of the blown air.

The following description will be made as to the case where thermistor 2 is mounted on the refrigerant evaporator surface at its outlet portion of air to be cooled. Therefore, since the thermistor 2 is effected by the temperature of the evaporator, the actual air temperature is slightly higher than the detected temperature.

The divided voltage $V_T$ of voltage divider 3 changes according to the temperature variation of the blown air and, therefore, is a signal representing the temperature of the blown air. The detected temperature signal $V_T$ is compared at comparator 1 with a reference voltage $V_{R1}$ which is generated from a voltage divider 4 formed by resistors $R_2$ and $R_3$. The reference voltage $V_{R1}$ is designated to be equal to the temperature signal $V_T$ detected at a time when the blown air is at a predetermined temperature $T_1$ (for example, 0° C.), and is applied to a non-inverting input terminal (+) of comparator 1.

When the temperature of the blown air is higher than the predetermined temperature $T_1$, the output of comparator 4 is maintained high in voltage level because the reference voltage $V_{R1}$ is higher than the temperature signal $V_T$. On the other hand, when the temperature of the blown air is lowered below the predetermined temperature $T_1$, the output of comparator 1 is changed low in voltage level because the reference voltage $V_{R1}$ is lower than the temperature signal $V_T$.

Figure 2:
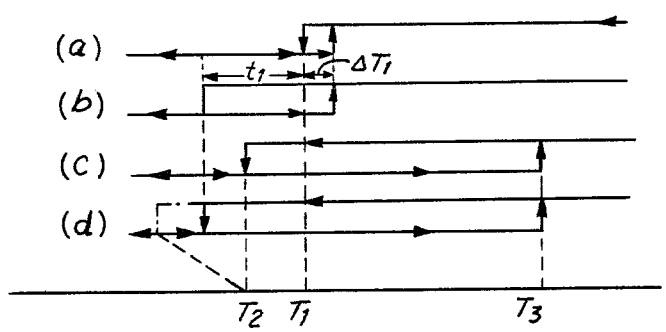
FIG. 2 is a view illustrating output response of each comparator in FIG. 1 to temperature.

Comparator 1 has a feed-back resistor $R_4$ so that the input-output response has a hysteresis. That is, in course of increase of the temperature signal $V_T$ from a level lower than the reference signal $V_{R1}$, the output changes from the high level to the low level at a time when the temperature signal $V_T$ becomes equal to the reference signal $V_{R1}$. However, in course of decrease of the temperature signal $V_T$ from a level higher than the reference signal $V_{R1}$, the output changes from the low level to the high level at not a time when the temperature signal $V_T$ becomes equal to the reference signal $V_{R1}$ but a time when the temperature signal $V_T$ becomes lower than the reference signal $V_{R1}$ by a certain amount. As a result, the output response of comparator 1 to the temperature has a hysteresis as shown by (a) in FIG. 2. The temperature difference $\Delta T_1$ (which is usually 2°–3° C.) is determined by the resistance of resistor $R_4$.

The output of comparator 1 is coupled with a non-inverted input terminal (+) of a similar comparator 5 such as an operational amplifier through a delay circuit 6 which is a charging and discharging circuit composed of a resistor $R_5$ and a capacitor C. The delay time is determined by a time constant $\tau$ ($=R_4 \times C$) of resistor $R_4$ and capacitor C. In the shown embodiment, a diode $D_1$ is connected in parallel with resistor $R_5$ so that resistor $R_4$ is short-circuited by diode $D_1$ at a time when the output of comparator 1 is a high level signal. Therefore, when the output of comparator 1 changes from the high level to the low level, the voltage level of the non-inverting input terminal (+) of comparator 5 changes from the high level to the low level after a time period $t_1$ when the change of capacity C is discharged through resistor $R_5$. On the other hand, when the output of comparator 1 changes from the low level to the high level, the voltage level of the non-inverting input terminal (+) of comparator 5 changes instantly from the low level to the high level, because capacity C is instantly changed through diode $D_1$.

An inverting input terminal (−) of comparator 5 is coupled to a voltage divider 7 composed of resistors $R_6$ and $R_7$, and is maintained a constant voltage level which is higher than the low level output of comparator 1 but lower than the high level output of comparator 1. Therefore, the output of comparator 5 is a high level during a time when the output of comparator 1 is the high level, and changes to a low level with a delay of a time period $t_1$ (for example, 10 minutes) at a time when the output of comparator 1 changes from the high level to the low level. At a time when the output of comparator 1 changes from the low level to the high level, the output of comparator 5 changes from the high level to the low level without delay. Comparator 5 does not have a hysteresis. Accordingly, the output response of comparator 5 is as shown by (b) in FIG. 2.

Another voltage comparator 8 such as an operational amplifier compares the temperature signal $V_T$ with another reference signal $V_{R2}$ which is generated by another voltage divider 9 comprising resistors $R_8$ and $R_9$. The reference voltage $V_{R2}$ is designated to be equal to the temperature signal $V_T$ which will be detected at a time when the blown air is at a predetermined temperature $T_2$. The temperature $T_2$ is determined lower than the temperature $T_1$.

It will be easily understood that the output of comparator 8 is a high level at a time when the temperature of the blown air is higher than the predetermined temperature $T_2$. On the other hand, it is low level at a time when the temperature of the blown air is lower than the predetermined temperature $T_2$.

Comparator 8 has a feed-back resistor $R_{10}$ to provide a hysteresis so that the output of comparator 8 may change from the low level to the high level at an elevated temperature $T_3$ (for example, 5° C.) higher than not only $T_2$ but also $T_1$. The temperature $T_3$ should be selected considering that the frost on the evaporator may be removed during the time period of the temperature elevation to $T_3$. The output response of comparator 8 to the temperature is as shown by (c) in FIG. 2.

As shown in FIG. 1, the non-inverting input terminal (+) of comparator 8 is connected to not only voltage divider 9 but also the output of comparator 5 through a diode $D_2$. The anode of diode $D_2$ is connected to the non-inverting input terminal (+) of comparator 8. Therefore, the voltage level of the non-inverting input terminal of comparator 8 is lowered during a time when the output of comparator 5 is the low level. Accordingly, even if the temperature signal $V_T$ is still lower than the reference signal $V_{R2}$, the output of comparator 8 is made to change to the low level by the low level output of comparator 5. Therefore, when the reference signal $V_{R2}$ is determined to be a quite low temperature such as $-10°$ C. or when the evaporator is frosted so that the cooling effect is degraded, the output of comparator 8 is changed to the low level by the output of comparator 5 before the temperature of the blown air is cooled to the temperature $T_2$. The output response of comparator 8 to the temperature in that case is shown at (d) in FIG. 2.

A transistor 10 forms a switching circuit, resistors $R_{11}$, $R_{12}$ and $R_{13}$ are bias resistors. A relay 11 is connected in a collector circuit of transistor 10, and its operating contact 11-1 is connected in series with an electromagnet coil 12 of an electromagnetic clutch (not shown). When transistor 10 is conductive, relay 11 is in an operative condition so that electromagnet coil 12 is energized so that the automobile engine output is transmitted to the refrigerant compressor.

Outputs of comparators 5 and 8 are connected to a common connection point 13 between resistors $R_{11}$ and $R_{12}$ through diodes $D_3$ and $D_4$, respectively. Therefore, when any one of outputs of comparators 5 and 8 is the low level, the level of the common connection point 13 is also low so that transistor 10 is switched off. Therefore, relay 11 is not energized and, therefore, its contact 11-1 is open, so that electromagnet coil 12 is not energized. Accordingly, the refrigerant compressor is not driven.

Figure 3:
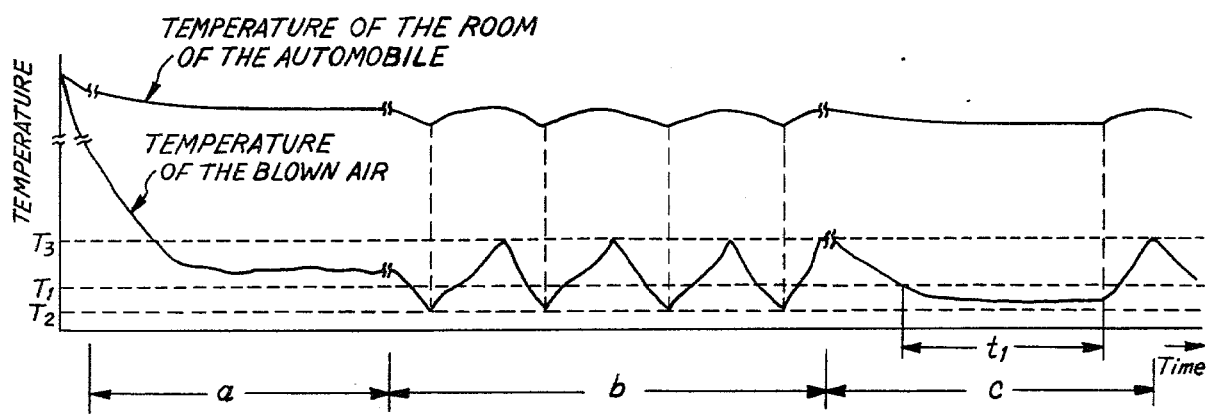
FIG. 3 is a view illustrating the temperature changes of the blown air and the automobile room in operation of the automobile air-conditioning system.

In operation, after the operation of the air-conditioning system start, air is cooled at the evaporator of the refrigerating system and blown into the automobile room. The air in the automobile room is sucked and cooled at the evaporator. Thus, air circulates between the evaporator and the automobile room, and therefore, the temperature of the blown air is gradually lowered, as shown at a period a in FIG. 3.

When the temperature of the blown air is lowered to a predetermined temperature $T_1$, the output of comparator 1 changes from the high level to the low level.

If the predetermined reference temperature $T_2$ is relatively high and is selected to be slightly lower than the reference temperature $T_1$ (for example, $T_1 = 0°$ C. and $T_2 = -3°$ C.), and if the evaporator is not frosted, the air temperature is further lowered to the reference temperature $T_2$ during a short time period which is shorter than the delay time $t_1$ because the compressor is still driven. At that time, the output of comparator 8 changes from the high level to the low level, so that transistor 10 is switched off. Accordingly, electromagnet coil 12 of the electromagnetic clutch is deenergized so that the operation of the refrigerant compressor is stopped. Thereafter, the blown air temperature gradually elevates to the reference temperature $T_3$. Then, the output of comparator 8 changes from the low level to the high level. Therefore, transistor 10 is switched on to energize relay 11 so that electromagnet coil 12 is energized to drive the refrigerant compressor. Thereafter, similar operation is repeated, and the temperature of the blown air changes as shown during a time period b in FIG. 3.

In the course of the operation, since the output of comparator 8 changes from the high level to the low level before the delay time $t_1$ elapses, the later output change of comparator 5 does not affect the output of comparator 8. Furthermore, since the reference temperature $T_1$ is lower than the reference temperature $T_3$, the output change to the high level of comparator 1 is prior to that of comparator 8 and, therefore, the output change to the high level of comparator 5 is also prior to that of comparator 8. Therefore, the output of comparator 5 does not affect the output of comparator 8.

If the reference temperature $T_2$ is sufficiently low (for example, $T_2 = -10°$ C.) or if the evaporator is frosted, the delay time $t_1$ elapses until the blown air is cooled to the temperature $T_2$ after the output of comparator 1 changed from the high level to the low level. As a result, the output of comparator 5 changes from the high level to the low level to switch off transistor 10 so that the operation of compressor is stopped. As a result, the temperature of the blown air gradually elevates, and the output of comparator 1 changes from the low level to the high level at the temperature $T_1$. At that time, the output of comparator 5 instantly changes from the low level to the high level because capacity C is instantly changed through diode $D_1$. However, since the output of comparator 8 was already changed to the low level by the low level output of comparator 5 through diode $D_2$, the low level output of comparator 8 is maintained until the temperature $T_3$ is detected by thermistor 2. Accordingly, the transistor 10 is maintained off so that the compressor is not driven. The change of the blown-air temperature is illustrated at a time period c in FIG. 3.

As will be understood from the above description, since the operation of the compressor is stopped after a lapse of the time period $t_1$ from a time when the blown air is cooled to the predetermined temperature $T_1$, it can be prevented that the compressor is driven for a long time under a condition that the evaporator is frosted.

Since the output of comparator 8 is the low level at a time when the output of comparator 5 is the low level, and since the high level output of comparator 5 does not control the switching transistor at a time when the output of comparator 8 is the low level, it will be understood that the output of comparator 5 must not be coupled to common connection point 13.

Figure 4:
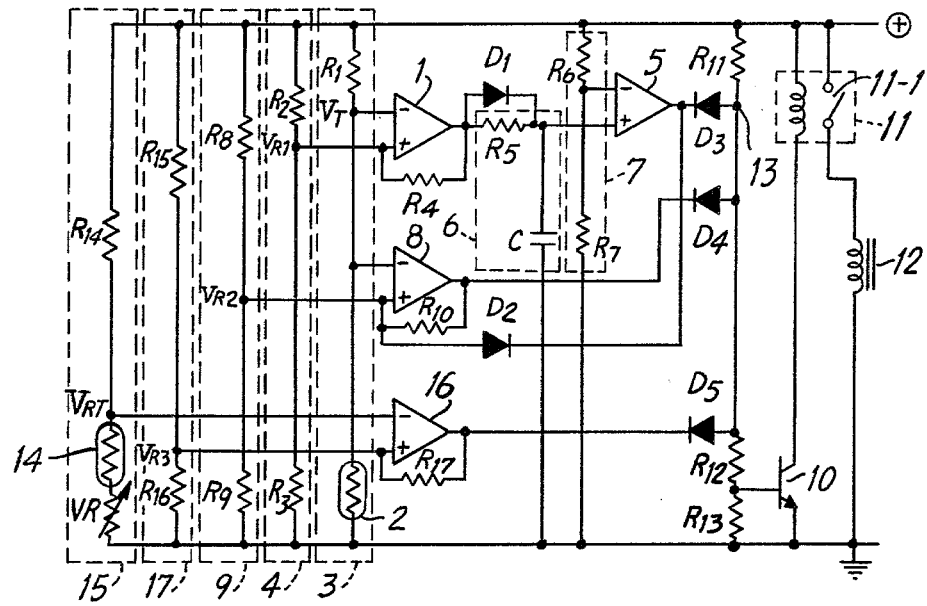

Referring to FIG. 4, another embodiment shown therein is characterized in that a circuit for controlling the operation of the compressor by the temperature of the automobile room is additionally provided to the temperature control circuit shown in FIG. 1.

A temperature sensor such as a thermistor 14 is disposed in the room of the automobile and forms a voltage divider 15 together with resistor $R_{14}$ and a variable resistor VR. A room temperature signal $V_{RT}$ is obtained as a divided voltage. The room temperature signal $V_{RT}$ is applied to an inverting input terminal (−) of a voltage comparator 16 such as an operational amplifier. A voltage divider 17 which is composed of resistors $R_{15}$ and $R_{16}$ generates a reference voltage $V_{R3}$. The reference voltage $V_{R3}$ is determined to be equal to the room temperature signal $V_{RT}$ at a time when the room of the automobile is at a predetermined temperature $T_4$. Temperature $T_4$ is selected to be a desired comfortable room temperature, for example, 25° C.

The room temperature signal $V_{RT}$ and the reference voltage $V_{R3}$ are compared at comparator 16 to provide a high level output at a time when the room temperature is higher than the reference temperature $T_4$ and to provide a low level output at a time when the room temperature is lower than the reference temperature $T_4$. The output of comparator 16 is coupled with the common connection point 13 through a diode $D_5$, so that the operation of the compressor may be stopped at a time when the output of comparator 16 is the low level, similar to the time when the output of comparator 8 is the low level.

Comparator 16 also has a feed-back resistor $R_{17}$ to provide a hysteresis to its output response to the input, so that, when the room temperature elevates from a temperature below $T_4$, the output change to the high level of comparator 16 effects not at the temperature $T_4$ but at a temperature $T_5$ higher than $T_4$. The temperature $T_5$ is selected to be a desired temperature, for example 28° C., by selecting the feed-back resistor $R_{17}$.

When the output of comparator 16 changes from the low level to the high level at the temperature $T_5$, transistor 10 is switched on, if the output of each one of comparators 5 and 8 is not the low level, so that the compressor is driven.

According to this embodiment, the temperature control can be effected as to the room temperature in addition to prevention of frost on the evaporator in the embodiment of FIG. 1.

Variable resistor VR is for adjusting the reference temperature $T_4$ and $T_5$. When the resistance of resistor VR is changed, the level of the room temperature signal $V_{RT}$ at a temperature changes. As a result, even if the reference voltage $V_{R3}$ is not changed, the temperatures $T_4$ and $T_5$ are equivalently changed. Therefore, the controlled room temperatures $T_4$ and $T_5$ can be manually adjusted by the driver of the automobile.

Figure 5:
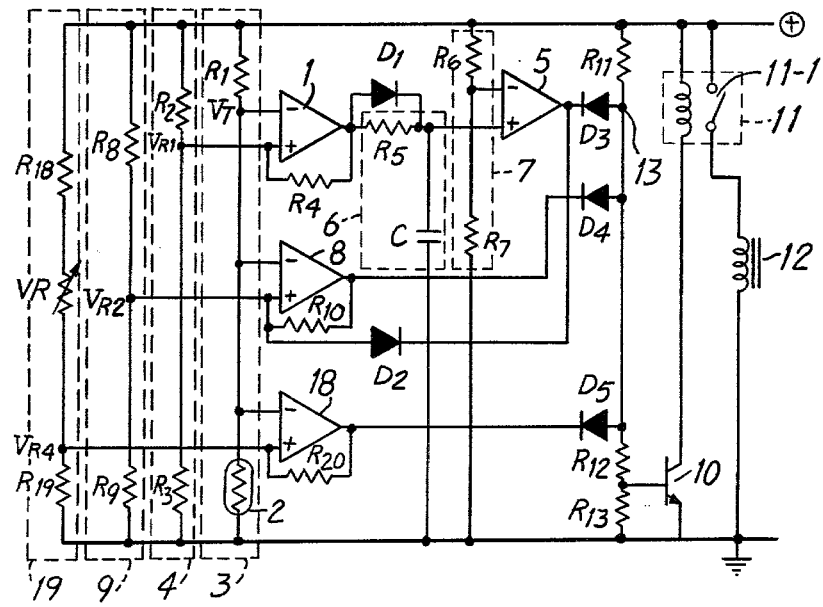

FIG. 5 shows another embodiment of this invention, which is characterized in that an automobile room temperature control circuit using the temperature signal $V_T$ is additionally provided to the control circuit in FIG. 1. In this embodiment, the temperature signal $V_T$ from thermistor 2 is applied to an inverting input terminal (−) of a voltage comparator 18 such as an operational amplifier. On the other hand, a reference voltage $V_{R3}$ is applied to the non-inverting input terminal (+) of comparator 18 from a variable reference voltage generator 19 which is composed of resistors $R_{18}$ and $R_{19}$ and a variable resistor VR. The output of comparator 18 is coupled to the common connection point 13.

Since the reference signal $V_{R4}$ is manually adjusted by changing the resistance of the variable resistor VR, the temperature of the blown air at a time when the output of comparator 18 changes between the high level and the low level can be readily adjusted. The low level output of comparator 18 stops the operation of the compressor similar to the low level output of comparator 8, and the high level output of the comparator 18 permits the compressor to be driven. Therefore, since the driver can manually adjust the temperature of the blown air to maintain the room temperature comfortable. In this embodiment, the room temperature control can be effected in addition to prevention of frost on the evaporator similar to the embodiment of FIG. 1.

Comparator 18 also has a hysteresis defined by a feed-back resistor $R_{20}$.

Figure 6:
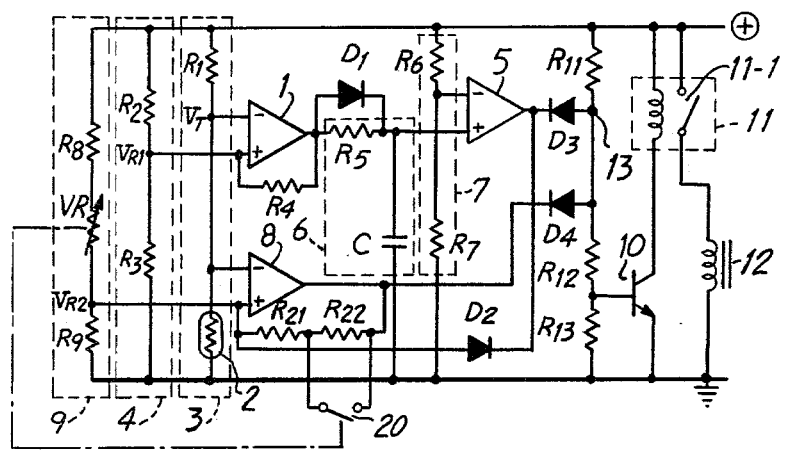
FIGS. 4-6 are circuit diagrams of different embodiments of this invention.

FIG. 6 is a modification of the embodiment of FIG. 1, which is characterized in that the reference signal $V_{R2}$ is changed by manually changing the resistance of a variable resistor VR which is connected in series with resistors $R_8$ and $R_9$. Therefore, the temperatures $T_2$ and $T_3$ are variable, so that the temperature of the blown air may be adjusted to a desired temperature. Thus, the room temperature control can be also effected.

In FIG. 6, two resistors $R_{21}$ and $R_{22}$ are used as the feed-back means of comparator 8. One resistor $R_{22}$ is made to be selectively short-circuited by a switch 20 which is operated together with variable resistor VR. Since the feed-back resistance is changed by switch 20 turned on, the hysteresis is also changed so that the time period when the operation of the compressor is stopped may be changed. Thus, the desired air-condition can be selected.

As described above, the operation of the compressor is stopped after the lapse of a predetermined time period from the time when the blown air temperature is lowered to a predetermined temperature, and since the operation of the compressor is not restarted until the temperature of the blown air elevates to a predetermined higher temperature, the frost on the evaporator can be effectively prevented. The control of the room temperature of the automobile can be readily effected.

What is claimed is:

1. In a temperature control circuit of an automobile air-conditioning system which has a refrigerating system including a refrigerant compressor and a refrigerant evaporator, a blower system for blowing air into the room of the automobile through said evaporator, and the temperature control circuit for controlling the operation of said refrigerant compressor in response to the temperature detected, the improvement which comprises:

first temperature detecting means for detecting the temperature of the air blown into the automobile room as an electric signal;

first reference signal source means for generating a predetermined reference signal equal to the output signal of said first temperature detecting means corresponding to a predetermined first temperature;

first comparing means for comparing the output from said first temperature detecting means with said first reference signal and providing a first output at a time when the detected temperature is higher than said first temperature and a second output at a time when the detected temperature is lower than said first temperature;

delay means for delaying said second output by a predetermined time period;

means coupled with the output of said delay means for generating a signal for stopping the operation of said refrigerant compressor;

means coupled with the output of said stop-signal generating means and with the output of said first temperature detecting means and maintaining an output signal for stopping the operation of said refrigerant compressor from the reception of the stop signal from said stop-signal generating means until a time when a predetermined second temperature higher than said first temperature is detected by said first temperature detecting means; and means for controlling the operation of compressor driving means and coupled with the output of said stop-signal maintaining means to thereby stop the operation of said compressor during a time period when said stop signal is present at the output of said stop-signal maintaining means.

2. The improvement as claimed in claim 1, which further comprises second temperature detecting means for detecting the temperature of said room of the automobile:

second reference signal source means for generating a predetermined reference signal equal to the output signal of said second temperature detecting means corresponding to a predetermined third temperature;

second comparing means for comparing the output from said second temperature detecting means with said second reference signal and providing a first output at a time when the detected temperature is higher than said third temperature and a second output at a time when the detected temperature is lower than said third temperature; and means for feeding said second output from said second comparing means to said controlling means to thereby stop the operation of said compressor.

3. The improvement as claimed in claim 1, which further comprises:

third reference signal source means for generating a reference signal which is variable corresponding to a desired temperature and which is equal to the output signal of said first temperature detecting means corresponding to a desired fourth temperature;

third comparing means for comparing the output from said first temperature detecting means with said third reference signal and providing a first output at a time when the detected temperature is higher than said fourth temperature and a second output at a time when the detected temperature is lower than said fourth temperature; and means for feeding said second output from said third comparing means to said controlling means to thereby stop the operation of said compressor.

* * * * *